Figure 1:
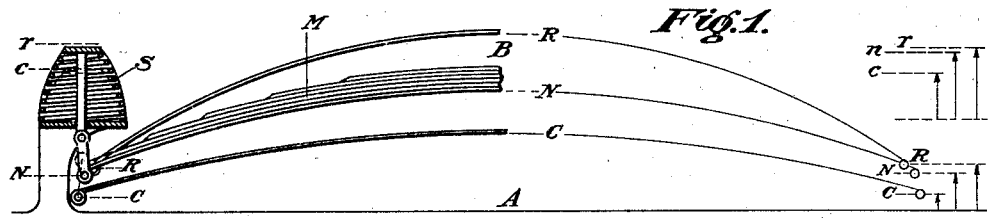

Inventor:
F. L. O. Wadsworth

May 29, 1928. 1,671,332
F. L. O. WADSWORTH
COMPLEMENTARY SPRING SUSPENSION SYSTEM
Filed July 24, 1923 4 Sheets-Sheet 2
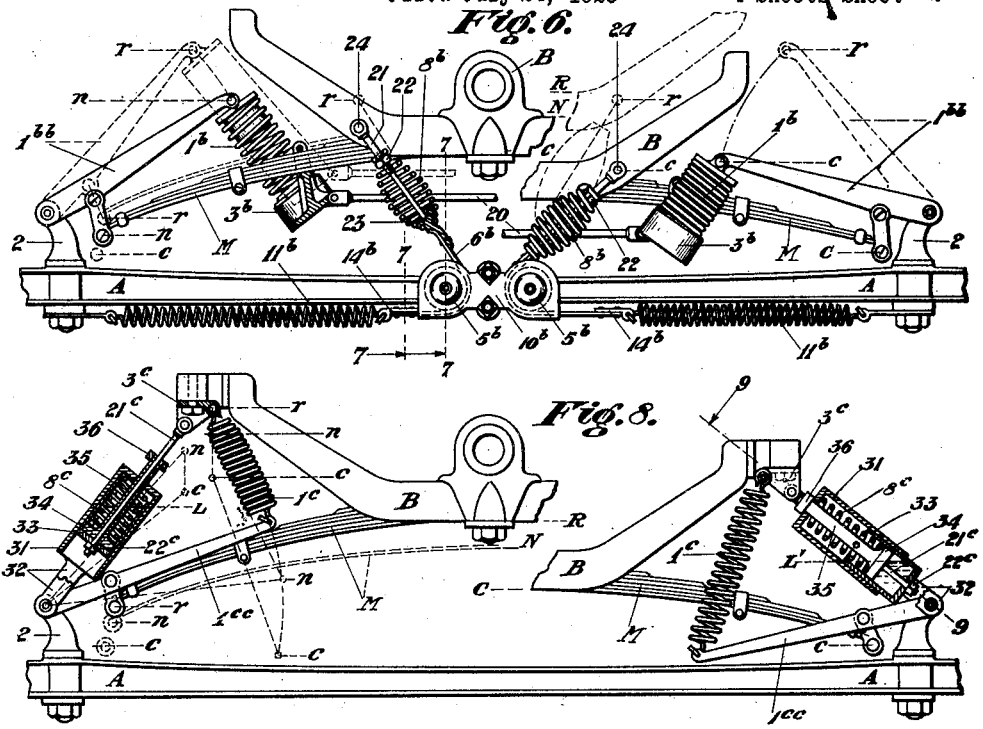
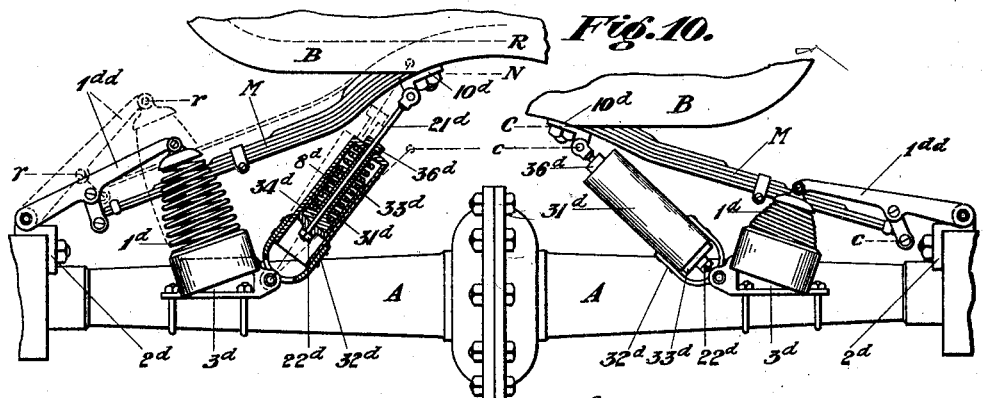
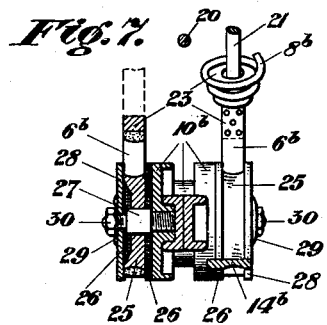
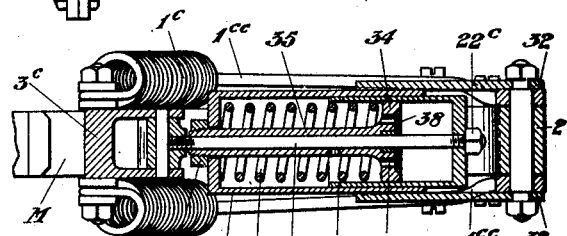
Inventor:
F. L. O. Wadsworth May 29, 1928.  
F. L. O. WADSWORTH  
1,671,332  
COMPLEMENTARY SPRING SUSPENSION SYSTEM  
Filed July 24, 1923  
4 Sheets-Sheet 3
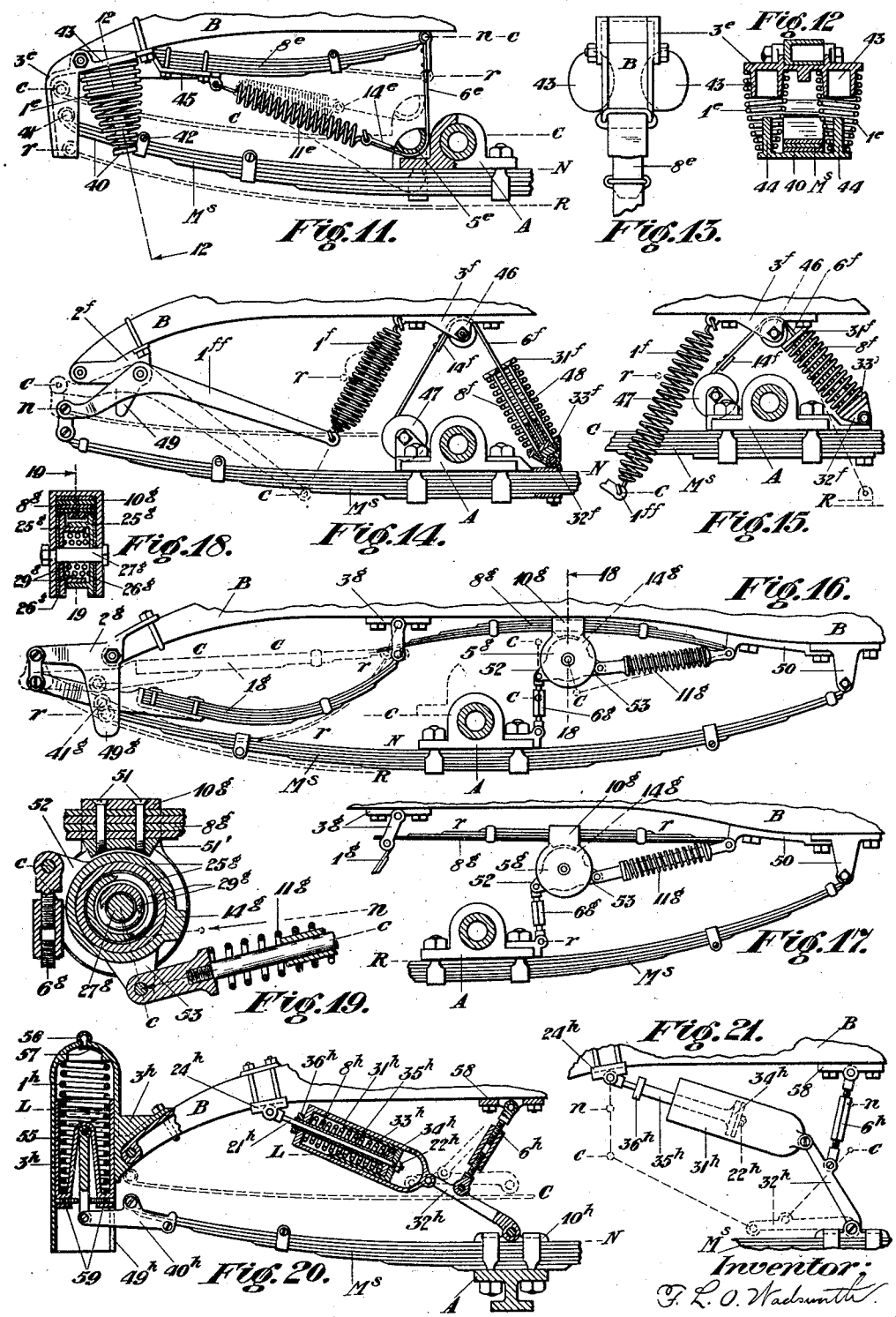
Inventor:  
F. L. O. Wadsworth

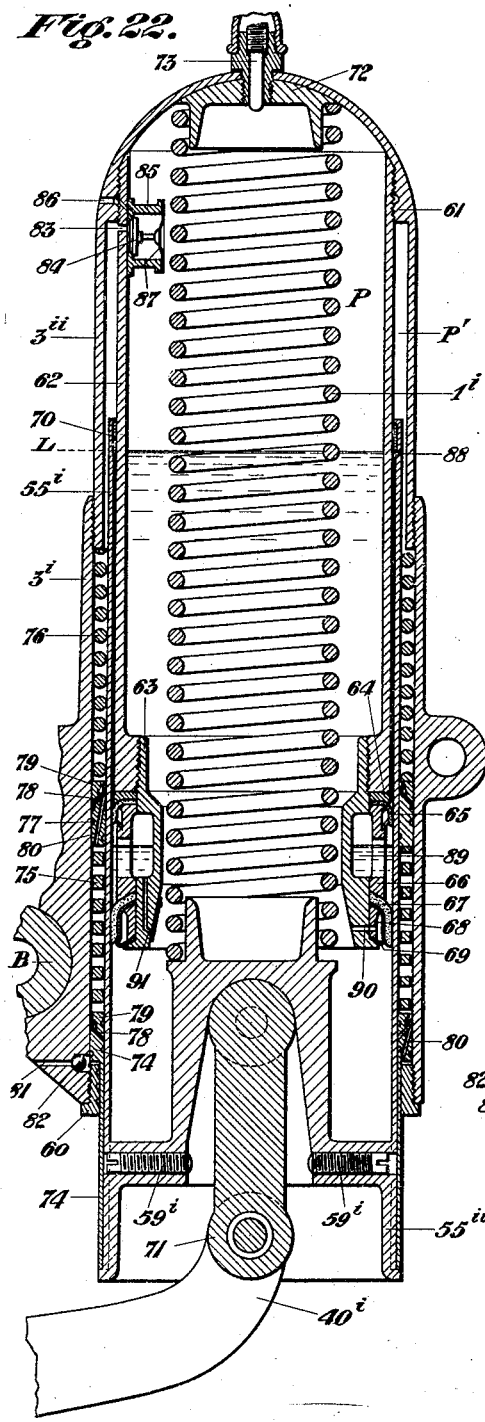

Patented May 29, 1928.

1,671,332

UNITED STATES PATENT OFFICE.

FRANK L. O. WADSWORTH, OF PITTSBURGH, PENNSYLVANIA.

COMPLEMENTARY SPRING SUSPENSION SYSTEM.

Application filed July 24, 1923. Serial No. 653,460.

My invention relates to spring suspension systems for elastically supporting vehicle bodies and other structures which are exposed to excessive vibration, or to reciprocatory and reversed displacement stresses of variable character and magnitude; and the generic object of my present improvements is to provide a combination of elastic suspension elements which will mutually co-operate with each other in effectively cushioning and eliminating the effect of either rapid short period vibrations, or of slower long period oscillations; and which will be equally efficient in elastically resisting and absorbing either the compressive shocks, or the succeeding rebound and upthrow movements, to which the spring connected members may be alternately subjected. More specifically stated, the general purpose of my invention is the provision of a complementary assemblage of co-acting springs which will have a very high degree of sensitiveness and resilience in quickly taking up and automatically balancing the effect of either small or large increases in the kinetic load stress; and which will also present a smooth and progressively augmented restraint on any resultant recoil or reversed flexure of the compressed springs when these kinetic increases in load are relieved, or when the suspension system is subjected to suddenly applied expansion stresses.

A more specific feature of these improvements is the provision of supplemental spring supports which are interposed between the more flexible portion, or portions, of a main spring suspension member and that part, or parts, of the chassis frame to which the main spring is ordinarily shackled—and which act in series with the said main spring to greatly increase the sensitiveness and range of action of the elastic supporting elements—in combination with an auxiliary rebound check member which is interposed between the substantially rigid portion of the primary spring support (or the chassis member on which this rigid portion is mounted) and the opposed or relatively movable part of the suspended structure; this auxiliary or complementary elastic restraint element acting in parallel with the main and supplemental springs first enumerated, and serving to conjointly resist the separation of the suspended parts beyond normal load position, and to also restrain or prevent the abnormal reverse bending and the resultant weakening or possible rupture, of the main spring.

Figure 2:
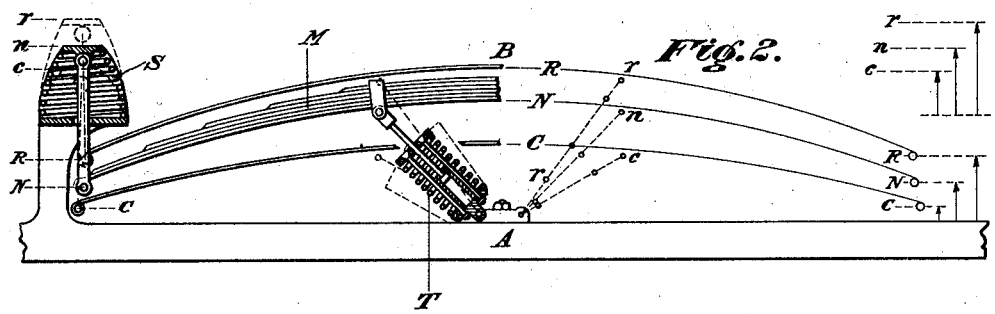

In the drawings, Figs. 1 and 2 represent diagrammatically the characteristic features of functional distinctions between previously used forms of shock absorber construction (Fig. 1) and my invention (Fig. 2). Figs. 3 to 23 represent various structural embodiments of the principles of the invention.

The general principle of operation that characterizes this improved combination is diagrammatically illustrated in Fig. 2 of the accompanying drawings; and the characteristic features of functional distinction between it and the conventional, or ordinary, type of supplemental spring suspension system will be readily appreciated by a brief comparison between this illustration and the contrasted showing of Fig. 1, which depicts the correlative and contradistinctive conditions of action in the case of such previously used forms of shock absorber construction. When these two contrasted organizations are subjected to compressive shocks (i. e., to kinetic increases in compressive stress), the main and supplemental springs M and S are concurrently and co-operatively subjected to increased flexures—which move them from the normal or static load positions and forms N—N—n to the augmented load positions C—C—c (of both figures)—and in this phase of the operation there is no substantial difference between the two types of construction. But when these suspension systems are subjected to rebound or expansion stresses—which carry the spring elements from the positions N—N—n to R—R—r (of the two figures)—there is a very marked and fundamental distinction between the action depicted in Fig. 1 and that shown in Fig. 2. In the ordinary supplemental spring construction (as diagrammatically illustrated in Fig. 1) the rebound or expansion of the secondary elastic supports S, S. and of the associated flexible end portions of the main spring M, is limited, or checked, by suitable stops—in order to maintain stability and restrict side sway, etc.—but the intermediate part of this main spring is not subjected to any such restraint; and any unusual or abnormal separation of the spring connected members will, therefore, result in a reverse bending, or negative flexure of the primary suspension member, that may loosen or break the spring clips, or even rupture one or more of the leaves thereof. In my improved construction, the supplemental spring supports S, S are not subjected to any rebound restraint, and can, therefore, open out or recoil freely as the axle and body members separate; but this expansion movement is elastically resisted and quickly checked by the immediately initiated and progressively increased restraint of the rebound springs, T, which conjoin the thick central part of the main spring M (or that member to which this part is attached) with the opposing and relatively movable member of the chassis frame. The reversely directed spring tensions on the center and ends of the main leaf spring support M (i. e., the restraining tension of the spring T and the expanding tensions of the springs S, S) act conjointly to restrain the recoil movement of this main spring member, and to prevent any reverse or negative bending thereof (beyond its normal unloaded form) under the most extreme conditions of rebound or expansion. The rebound check members T are preferably arranged in pairs, with their axes symmetrically disposed and inclined to the central longitudinal plane of the vehicle frame; and when so arranged the oppositely directed tensions of these complementary elastic elements will resist any relative transverse displacement of the assembled parts, and will prevent the unpleasant, and oftimes dangerous, side sway of the flexibly suspended body when the vehicle is being driven over rough roads, or around corners, at a high speed. When the rebound or expansion movements are arrested and the parts return from the positions R—r to the positions N—n of static equilibrium, the normal load on the suspension system will be gradually reapplied to the expanded supplemental springs S, S, and transmitted therefrom to the flexible portions of the main spring M (or vice versa) until these series connected elements have been subjected to their full normal load flexure; and at this stage of the action the further expansion of the complemental springs T is preferably arrested—by suitable stops—and the said springs are so arranged as to remain inactive during the further compressive flexure of the elastic supports S, S and M.

Figure 3:
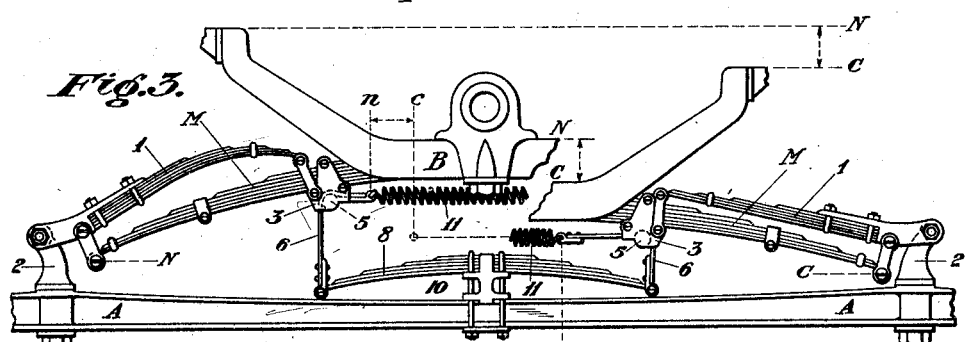
Figure 4:
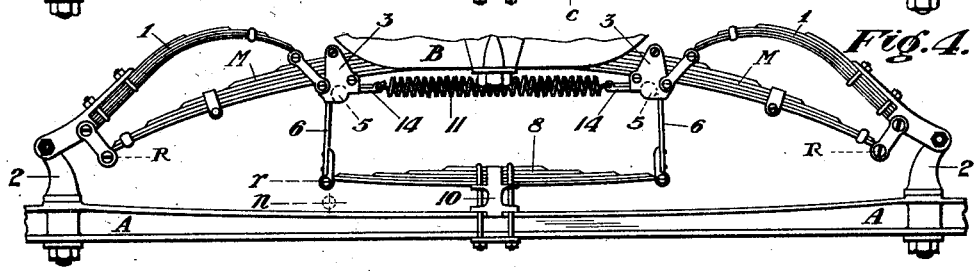
Figure 5:
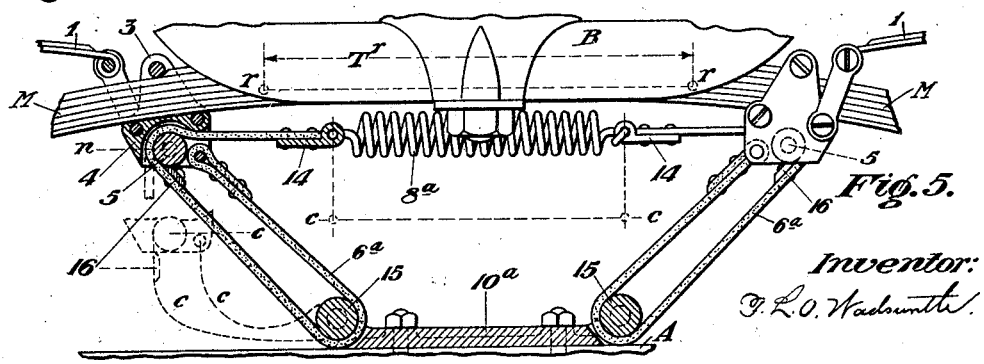

The combination of elastic control elements, M—S and T, which is diagrammatically outlined in Fig. 2, constitutes one general embodiment of my present invention; and it will now be understood—from the preceding description—that one of the most important advantages of this improved triple-spring combination is the substantial elimination of all of the detrimental and dangerous effects that result from the unrestrained, or insufficiently restrained, expansion movements of an undamped and highly sensitive supplemental spring suspension system, without any sacrifice of the resiliency and easy riding qualities that are possessed by such a system. But in order that various applications of the present improvements may be more fully understood—and for the further purpose of exemplifying more completely various features and advantages that may not be specifically pointed out in my statement of the objects of my invention—I have hereinafter described in greater detail a number of embodiments of these improvements. These several embodiments are illustrated in Figs. 3 to 23 of the accompanying drawings which form a part of the said description; and reference to the specification as a whole (i. e., to both drawings and descriptive text) will enable those skilled in the art to recognize and appreciate the character and the scope of the invention, as herein claimed. In these drawings:

Fig. 3 is a composite front elevation of one form of my invention as applied to the front cross leaf spring support of a Ford car—the left hand side of this view showing the parts in normal load position (N) and the opposite right hand side showing the parts in an abnormally loaded or compressed position (C)—Fig. 4 is a similar view showing the suspension system of Fig. 3 in its expanded position R—r; Fig. 5 illustrates a modification, or alternative form, of the rebound check element that constitutes a part of the complemental triple-spring combination of Figs. 3 and 4; Fig. 6 is a composite view, similar to that of Fig. 3, of a second embodiment of my improvements, and illustrates the parts not only in their normal and compressed positions (N—n and C—c) but also, in dotted lines, in their rebound positions (R—r); Fig. 7 is a composite cross section and end elevation on the double planes 7—7 of Fig. 6; Fig. 8 is another composite front elevation—partially in section—of a third exemplification of this invention; Fig. 9 is a sectional plan view on the inclined plane 9—9 of Fig. 8; Fig. 10 is a composite rear elevation (and partial section) of another form of my improved triple spring combination, as applied to the rear cross leaf spring suspension of a Ford car; Fig. 11 is an elevation of a side leaf spring suspension that is constructed in accordance with my invention; Fig. 12 is a cross section on the plane 12—12 of Fig. 11; Fig. 13 is a plan view of a portion of this same construction; Fig. 14 is a partial elevation of a sixth embodiment of this invention, and illustrates the spring suspension elements in the position of static equilibrium (N—n); Fig. 15 is another view of a portion of this same structure with the secondary support elements therefor in a kinetically loaded and compressed position (C—c); Fig. 16 is a composite side elevation of still another exemplification of my improvements, which depicts the various parts in the position of normal load, and also indicates, in dotted lines, the positions (C—c) of certain elements when the system is compressed and the contrasted positions (R—r) of the same elements when the system expands; Fig. 17 is a side elevation of the rebound check elements of the construction of Fig. 16 with the operating parts in rebound position (R—r); Fig. 18 is a vertical cross section on the plane 18—18 of Fig. 16; Fig. 19 is a longitudinal section on central plane of Figs. 16 and 17 (i. e., the plane 19—19 of Fig. 18); Fig. 20 is a partial sectional elevation of an eighth embodiment of the present improvements; Fig. 21 is a side elevation of the last mentioned embodiment with the rebound check member thereof in the position of action; and Figs. 22 and 23 are detail sectional views of semi-pneumatic spring members, which are particularly designed and adapted for use as the supplemental support elements of side leaf spring combinations; such, for example, as are shown on sheet III of the drawings.

In the illustrative organization depicted in Figs. 3 and 4 the ends of the main cross leaf spring M are suspended from the intermediate portions of supplemental lever-springs 1—1, which are pivoted at their outer ends on the reversed axle perches, 2, 2, and which are shackled, at their inner extremities, to the main spring body brackets 3, 3. These brackets 3, 3, are supported on the substantially rigid central portion of the main spring M; and each of them is provided, at its lower side or edge, with spacer block and drum elements, 4—5, that are so shaped and positioned as to form a sinusoidal, or S shaped, slot for the reception of a flat strap 6 of leather or other flexible material (as best shown in sectional detail at the left of Fig. 5). In the arrangement shown in Figs. 3 and 4 the lower ends of the straps 6—6 are attached to the opposite extremities of the auxiliary leaf spring 8, which is clamped, at its center, to the axle block 10; and the upper and inner ends of the said straps are connected with each other by a tension spring 11. The detailed action of this combination is as follows: When the system is subjected to an increased load stress the main and supplemental leaf spring M and 1, 1 are concurrently flattened out—as shown at the right of Fig. 3—and the approach of the body and axle members permits the spring 11 to contract, and draw the upper ends of the straps 6—6 toward each other, without altering the initial tension of the spring 8, and without imposing any resistance or frictional drag on the free elastic flexure of the load supporting springs 1—M—1. But when the kinetic compression stress is relieved, and the flexed suspension elements return to the positions N—n of static equilibrium, the tension of the spring 11 will hold the straps 6—6 in frictional engagement with the main spring bracket members 3—4—5; and the resultant pull of these straps on the ends of the spring 8 will exert a balanced sliding and elastic resistance to this return movement, and will thus restrain any tendency to a too sudden or too violent recoil of the parts from positions of extreme compression. The length of the straps 6—6 is preferably so adjusted that when the members are in the normal load position, N—n, of Fig. 3, the spring clip blocks 14—14, at the upper ends of the said straps, are in contact engagement with the bracket supports 3—3; and under such circumstances any rebound or expansion of the body and axle members beyond normal load position—toward the loci R—r of Fig. 4—will be resisted by the direct pull of the interengaged parts, 3—4—5—6 and 14, on the ends of the rebound check spring 8 (T), and by the progressively increased elastic flexure of this complementary control element. But this restraint will be exercised without imposing any check on the free expansion of the interconnected flexible portions of the main and supplemental suspension elements M and 1—1 (S); and the main leaf spring (M) is not therefore subjected to any reverse bending even when the rebound or expansion movements are exceptionally severe. The freedom of movement thus allowed to the ends of the primary support member—during rebound movements—would ordinarily be inadmissable because of the resultant lack of any control or check on side sway or relative lateral displacement of the body and axle parts; but in the case of my improved complementary spring organization all difficulties of this character are eliminated by the action of the two laterally separated and elastically tensioned connections, between the strongly flexed axle spring 8 and the rigidly coupled main-spring-body parts; and these relatively oscillating members will be held in transversely centered position with respect to each other, even if the lever-shackle connections between the ends of the main spring and axle perches 2 are entirely disconnected. And it will be further noted that this lateral centering action will become more and more powerful as the rebound movement increases in magnitude—because of the progressively increased tensions and the increased obliquity of the strap connections (6—6 etc.)—and the greatest resistance to side sway is therefore brought into play at the time when it is most needed.

The resistance to recoil of the kinetically compressed suspension elements, 1—M—1, may be readily varied by altering either the initial tension, or the elastic co-efficient, of the take-up spring 11; and the progressively increased elastic restraint to expansion movement and side sway may be independently controlled by varying either the length or the strength, or both, of the complementary rebound check spring 8 (T); and both of these controls may be adjusted, or altered at will, without affecting the sensitiveness or resiliency of the supplemental load carrying and cushioning springs 1—1 (S). This triple spring combination therefore presents a much wider range of action, and of adaptability to difficult conditions of service, than is attainable by any dual or double acting combination of main and supplemental springs alone.

Fig. 5 illustrates a slight modification of the rebound check mechanism previously described. In this alternative form of construction the outer, or lower, ends of the straps 6$^a$—6$^a$ are attached to the brackets 3—3; the intermediate portions of the said straps are passed around drums or rollers, 15—15, on the axle bracket 10$^a$, and then over the drums 5, in the brackets 3; and the upper and inner ends of these flexible connections are coupled to the opposite extremities of the rebound check coil spring 8$^a$. The straps 6$^a$ are provided with stop clips 16—16 which are adapted to engage with the lower edges of the bracket members 3—3, and prevent the spring 8$^a$ from contracting when the body and axle parts approach each other under the action of a kinetically increased load—as indicated by the dotted lines C—c of Fig. 5. In this case there is no check on the recoil movement of the load carrying springs from their compressed position to the normal load position—(although such a check might be imposed if desired by substituting a take-up spring for a part of each strap, 6$^a$, which leads from the bracket 3 to the axle drum 15)—but when the members separate beyond this position (N), the resultant sliding movement of the tightened strap connections 6$^a$—6$^a$ over and around the drums 15—5, subjects the initially tensioned spring 8$^a$ to a progressively increased flexure— (diagrammatically indicated by the dotted line T$^r$) that co-operates with the frictional resistance between the parts, 6$^a$—15—5, in restraining both the vertical expansion and the lateral displacement of the body and axle parts.

Fig. 6 illustrates another construction which is quite similar, in general form and arrangement of parts, to that shown in Figs. 3 and 4. In this exemplification of my improvements, each of the supplemental suspension members (S)—which support the ends of the main spring M—consists of a rigid lever 1$^{bb}$ (pivoted, at its outer end, on the axle perch 2) and a pair of coil springs 1$^b$ interposed between the inner end of this lever 1$^{bb}$ and the head of an inverted T-shaped bracket 3$^b$ that is clamped to the central relatively inflexible portion of the main spring, and is preferably connected to its fellow bracket (on the opposite side of the suspension system) by a tie rod 20. The complementary rebound check springs (T) are also arranged in pairs, on the opposite sides of the main spring and the tie rod 20; and each of these springs consists of a keg shaped coil 8$^b$ that is maintained under a preadjusted initial tension by means of an axial stop rod 21, which is connected to its upper terminal by an adjustable nut 22, and which is in contact engagement with its opposite or lower head 23. The upper ends of each pair of rods 21 are attached to the body frame by a cross bolt 24; and the heads 23 are each separately connected to flexible straps 6$^b$, which pass around members, 5$^b$ (that are mounted, in pairs, on the opposite sides of the axle bracket 10$^b$) and which are coupled to the ends of a corresponding number of take up springs, 11$^b$, by the clip blocks 14$^b$. Each of the members, 5$^b$, consists of a disc 25 and a pair of fibre friction washers 26—26, all of which are rotatably mounted on a stud pin 27 and are held in place against the side of the axle bracket 10$^b$ by the face plate 28, spring washers 29 and nuts 30 (see detail of Fig. 7).

The functional action of the various parts of this last described combination is in all respects analogous to that which characterizes the similar organization shown in Figs. 3 and 4. When the system is subjected to an increased kinetic load, the main and supplemental springs M and 1$^b$ are concurrently and increasingly flexed without changing the initial tension of the rebound check springs 8$^b$; but the springs 11$^b$ contract sufficiently to keep the straps 6$^b$ in constant tensioned engagement with the axle drums 25. When the system returns from the position, C—c, to position, N—n, the corresponding movement of the flexible connections over the faces of the discs 25— against the opposing pull of the take up springs 11$^b$—will introduce a combined frictional and elastic resistance to the separation of the body and axle parts that will "soften" or restrain the sudden recoil of the compressed load carrying springs, and thus present, or check, an overthrow, or rebound of the parts, beyond normal load position (N—n). When this position is reached the clip blocks 14$^b$ have become engaged with the adjacent edges of the axle bracket 10$^b$ and the plates 28—as shown in the left-hand portion of Fig. 6 and the right-hand portion of Fig. 7—and if the system is then subjected to rebound or expansion stresses, the further movement of the spring connected chassis members toward the dotted line positions R—r is elastically resisted, and very quickly checked, by the accompanying elongation, and the progressive increase in the initial tension, of the complemental rebound check springs $8^b$. The action of these symmetrically and oppositely inclined springs will also hold the oscillating chassis members in transversely centered relationship to each other, and thus permit the flexible load carrying elements, $M$—$1^b$, to expand with entire freedom—(and thus avoid reverse bending or straining of the main spring)—without loss of lateral stability.

In the construction illustrated in Fig. 8, the ends of the main spring M are suspended on double arm levers $1^{cc}$ which are pivotally supported on the axle perches 2—2; and the inner ends of each of these levers are connected with a body bracket $3^c$ by a pair of coil tension springs $1^c$—$1^c$ (Fig. 9). The axle perches and body brackets 2—$3^c$, are also operatively conjoined by rebound check members, the construction of which is clearly illustrated in the sectional views of Figs. 8 and 9. As there shown, each of these members consists of four principal parts, viz: an inverted cup 31 which is pivotally connected to the axle perch 2 by the arms or ears 32—32; an inner cup 33, which slides therein and which is adjustably coupled to the bracket $3^c$ by the threaded bolt and lock nut $21^c$—$22^c$; a piston member 34 which slides in the second cup 33 and which is provided with a stem 35 and a nut 36 that is adapted to engage with the closed head of the outer cap 31; and a compression spring $8^c$, which is interposed between the parts 31 and 34, and which is maintained under any desired initial tension by the adjustment of the nuts $22^c$ and 36. In the normal load positions of the parts (which are indicated by the dotted lines N—n—n at the left hand side of Fig. 8) the heads of the sliding members 33 and 34 are in contact and the nuts 36 are in engagement with the upper ends of the caps 31. When an increased load is imposed on the system the parts are moved toward the positions C—c—c (shown in full lines at the right of Fig. 8); and this movement is elastically resisted and restrained by the concurrently increased flexure of the main and supplemental suspension springs (M and $1^c$—$1^c$); without any alteration in the initial tensions of the springs $8^c$. The cups 33 are, however, moved downwardly, or away from the interengaged members 31—34, thus leaving openings between their heads and the pistons 34, (as shown at the right of Fig. 8 and in the plan view of Fig. 9). The cups 33 are partially filled with heavy oil or grease (e. g., to the level L), and the piston heads 34 are provided with ports 37 which are covered by outwardly or downwardly opening flap valves 38. When the compressive movement is taking place these valves open and allow the fluid in the cups 33 to flow into the openings below the heads 34 (as shown at the right of Fig. 8); but when the reverse or return movement—toward normal load position (N—n)—begins, the ports 37 are tightly closed and the fluid which is trapped in the spaces between the members 33 and 34 acts as a damper or check on the separation of the axle and body parts (2—3), and thereby restrains the too violent or rapid recoil of the abnormally flexed suspension springs;—the degree of damping restraint thus obtained being easily controlled by the volume and the viscosity of the liquid which is placed in the cups 33, and by the bearing clearances, or leakage, between the relatively movable parts 33—34—35 and $21^c$. When the parts have returned to the position of static equilibrium (N—n) the heads of the members 33 and 34 are again in engagement with each other; and any rebound or further expansion of the system (towards the positions R—r will move these interengaged members, as a unit, toward the heads of the outer cups 31, and thereby progressively compress and increasingly flex the rebound check springs $8^a$—$8^c$, (in the manner shown at the left hand of Fig. 8). The separation of the body and axle members beyond normal load position is thus elastically restrained and quickly checked—and the said members are also held in transversely centered relation to each other—by the action of the symmetrically positioned rebound check elements on the opposite sides of the vehicle body; and this restraint is exercised without interfering with the free undamped expansion of the flexible load carrying elements, and without imposing any constraint, or reflex bending, on the main leaf spring M.

Fig. 10 illustrates another complementary triple spring organization which is particularly designed for use as the rear cross leaf suspension of a Ford car. In this construction the flexible extremities of the main spring M are suspended on bifurcated, or twin arm, lever members $1^{dd}$, that are pivotally mounted on the brake drum brackets $2^d$; and the inner extremities of each lever are engaged by a pair of volute compression springs $1^d$, $1^d$, the lower ends of which are supported—on opposite sides of the rear axle—by a saddle bracket $3^d$. The brackets $3^d$, $3^d$ are also connected to main spring body clips $10^d$, $10^d$, by symmetrically and oppositely inclined rebound check members, each of which comprises a pair of twin-cup-piston-spring devices $31^d$—$33^d$—$34^d$—$8^d$ that are in all respects similar to those illustrated in Figs. 8 and 9; and which do not, therefore, require further description. The action of the various parts—when subjected to either compressive shocks or to expansion stresses—is also the same as that of the corresponding parts of the last described construction (Figs. 8 and 9) and will be readily understood without any additional explanation.

The third and fourth sheets of my drawings depict various applications of my invention—or of parts thereof—to side leaf spring suspensions. In the first of these illustrative applications (see Figs. 11, 12 and 13) the usual shackle link connections, between the rear end of the main side leaf spring $M^s$ and the body horn B, are removed; and there is substituted therefor a direct connected supplemental spring element (S) which comprises: (1) a T-shaped saddle block 40, which is attached to the eye end of the main spring $M^s$ by a countersunk, or flat head, screw 41 and to the adjacent flexible portion thereof by a clip bolt 42; (2) a forked or slotted body bracket $3^e$ which receives and guides the eye end of the saddle block 40, and which is provided with two flanged seats 43, 43; and (3) a pair of oval coil springs $1^e$, $1^e$, which are interposed between the seats 43 and the heads of the saddle block 40, and are held in position thereon by the projections 44, 44. The bracket $3^e$ is also provided with a third seat 45 to which is clamped the base of a rebound check leaf spring $8^e$; and the flexible extremity of this complementary suspension element is connected to a flexible strap, $6^e$, which passes around a block $5^e$ that is secured to the rear axle bracket A, and which is connected in turn—by the clip block $14^e$—with a take up spring $11^e$. When this system is subjected to compression shocks the resultant approach of the body and axle members B and A is elastically cushioned by the conjoint flexure of the series connected main and supplemental springs $M^s$ and $1^e$, without altering the initial flexure of the spring $8^e$; but this approach movement permits the strap $6^e$ to be drawn back around the curved surface of the block $5^e$ by the contraction of the spring $11^e$. The return of the system from its compressed position (C—c—c) to the full line position (N) is damped by the combined elastic and frictional resistance to the counterclockwise movement of the strap $6^e$ over the block $5^e$; and when this normal position has been reached the clip $14^e$ is engaged by the adjacent face of the said block. A further expansion or rebound movement (toward the positions R—r) then imposes a corresponding pull on the flexible end of the spring $8^e$ and subjects this element to a progressively increased flexure, that quickly checks the separation of the relatively oscillating chassis members, but does not interfere with the free expansion of the load carrying springs, or subject the main spring element to any reverse bending. Any side sway or lateral displacement of the free ends of the expanded springs $M^s$ and $1^e$—$1^e$—in relation to the body members B—is prevented, in part, by the lateral bracing action of the transversely separated and vertically tapered supplemental springs $1^e$—$1^e$, and in part by the sliding engagement of the parts 40—41 with the forked guide portion of the bracket $3^e$.

In the construction shown in Figs. 14 and 15 the outer eye end of the main spring $M^s$ is shackled to the adjacent extremity of a twin arm lever $1^{ff}$, which is pivotally supported—at an intermediate part of its length—on the body bracket $2^f$; and which is connected, at its inner ends, with a pair of tension coil springs $1^f$ that are supported on the body bracket $3^f$. The bracket $3^f$ also carries a guide roller 46 that supports the central portion of a strap $6^f$; and the latter is provided with a stop clip $14^f$ that is adapted to engage—in the normal load position N—n of Fig. 14—with the adjacent side of the said bracket. The outer end of the strap $6^f$ is connected to some suitable form of "one way" friction snubber 47 (e. g., such as that described in the Foster Patent No. 1,089,828) that is attached to the axle bracket A; and the opposite inner end of this strap is secured to a movable head $33^f$ that constitutes a part of the complementary rebound check spring element of this combination. The head $33^f$ normally rests on a block $32^f$, which is pivotally attached to an extension of the axle block A, and which is connected to an upper head $31^f$ by adjustable bolts 48 that pass through the head $33^f$ and serve to guide the latter in its movement. A powerful compression spring $8^f$ is interposed between the heads $31^f$ and $33^f$ and is maintained at any desired initial tension by the adjustable bolts 48. When the body and axle members are forced toward each other—or toward the position shown in Fig. 15—the lever $1^{ff}$ is rocked in a clockwise direction on its body bracket support $2^f$; the normal flexures of the main and supplemental springs $M^s$ and $1^f$ are cooperatively increased to balance the kinetic increase in load; and the strap connections $6^f$ etc. are kept taut by the "take up" action of the snubber 47; but the initial and preadjusted tension of the spring $8^f$ is not altered. The return of the parts to the normal load position of Fig. 14 is restrained by the opposed actions of the friction snubber 47 and the spring $8^f$, which are mutually and automatically balanced against each other until the clip $14^f$ is engaged by the bracket $3^f$; after which further rebound or expansion of the body and axle members is restrained by the progressively increased compression of the coil spring $8^f$ alone; the load carrying springs being left entirely free to expand as far as may be necessary to relieve any strain on the primary suspension member $M^s$. In this case the freely oscillating outer portion of the main spring is maintained in vertical alignment with the body (so as to eliminate any side sway or lateral unsteadiness) by the arm of the lever 11ᶠ, and by the guide block 49 which projects downwardly, between these arms, from the bracket 2ᶠ.

Figs. 16 and 17 illustrate another embodiment of my invention, which presents certain features of structure that are depicted more in detail in Figs. 18 and 19. In this embodiment the outer eye end of the main leaf spring Mˢ is pivotally attached, by the flat head screw bolt 41ᵍ, to an intermediate rigid portion of a flexible lever-spring member 1ᵍ; and the outer and inner ends of this member are respectively connected, by shackle links, to the Y-shaped bracket 2ᵍ and the link block 3ᵍ on the body frame B. The connection 3ᵍ also supports one end of a complementary leaf spring 8ᵍ, which is pivotally attached, at its other extremity, to an extension of the pillar block 50 that carries the inner end of the main spring Mˢ; and the stiff central portion of this spring 8ᵍ carries a friction drum member 5ᵍ whose construction is more fully illustrated in the two sectional views of Figs. 18 and 19. Reference to these figures shows that this member is, in many respects, similar to the one illustrated in Fig. 7, and that it comprises two intertelescoping cups, 25ᵍ—25ᵍ, and two fibre washers, 26ᵍ—26ᵍ, which are rotatably mounted, on a cross bolt 27ᵍ, between the legs of a U-shaped bracket 10ᵍ that encircles the spring 8ᵍ and is rigidly secured thereto by suitable screw and nut connections 51—51', etc. The rotatable cup elements 25ᵍ are expanded, and held in frictional engagement with the discs 26ᵍ and the legs of the bracket 10ᵍ, by the nested compression springs 29ᵍ—29ᵍ; and they are each provided with two projecting arms 52 and 53 that are flexibly connected, respectively, with the axle block, A, (by the adjustable link 6ᵍ) and with the body bracket 50 (by the expansible spring coupling 11ᵍ). The outer one of these cups 25ᵍ is further provided with a lug 14ᵍ which is adapted to engage with the clamp member 51, when the parts are in normal load position (Fig. 16), and prevent any further counterclockwise rotation of the frictionally engaged elements.

When this system is subjected to compression the lever-spring 1ᵍ is rocked in a counterclockwise direction and flattened out, and the drum elements 25ᵍ are rotated in a clockwise direction—as indicated by the dotted lines c—c—c of Fig. 16—without changing the form or initial flexure of the complementary spring 8ᵍ. The clockwise rotation of the cups and friction discs 25ᵍ—26ᵍ is assisted by the expansion of the spring 11ᵍ which is so positioned and tensioned that its rotative thrust on the arms 53 remains substantially constant as the movement continues (i. e., the moment arm increases in nearly the same proportion as the tension diminishes) and is always sufficient to overcome the frictional resistance to this rotation. But when the return movement (from the positions C—C shown in Figs. 16 and 19 toward the normal load positions (N—n) of Fig. 16) begins, the recoil of the compressed load carrying springs Mˢ and 1ᵍ is softened and retarded by the combined frictional and elastic resistance to the accompanying counterclockwise rotation of the drum elements, 25ᵍ—26ᵍ, etc; and this resistance is balanced against the initial tension of the complementary spring 8ᵍ until the stop 14ᵍ engages with the spring clamp nut 51'. When this engagement occurs the further separation of the body and axle members, B and A, beyond or above normal load position—or from the positions N—n of Fig. 16 toward the positions R—r of Fig. 17—is elastically resisted and quickly arrested by the increased flexure of the complementary rebound check spring 8ᵍ, without imposing any restraint on the continued expansion or reflexing of the series connected supplemental and main springs 1ᵍ and Mˢ, and without subjecting the latter to any negative bending or counterstrain. During this free expansion movement the interconnected portions of the flexible load carrying elements are maintained in the proper vertical alignment with the body members B by the shackle and pintle connections between the parts Mˢ—1ᵍ—2ᵍ and 3ᵍ, and also by the close engagement of the slotted guide leg, (49ᵍ) of the I-shaped body bracket 2ᵍ with the sides of the bifurcated rigid portion of the lever-spring member 1ᵍ.

The suspension system illustrated in Figs. 20 and 21 is particularly designed and adapted for the front side-leaf-axle-spring mounting of a heavy car. In this construction the forward end of the axle spring Mˢ is detached from its conventional pintle pin connection with the front horn of the body frame B, and is provided with a bracket extension 40ʰ, which passes through a guide slot 49ʰ in the side of an inverted cup-shaped body casing 3ʰ and is pivotally attached to an elongated plunger 55 that is reciprocably mounted in this casing. A supplemental coil spring 1ʰ is interposed between the parts 3ʰ and 55; and the spring chamber is partially filled with heavy oil or grease (e. g., to the level L) which serves to both lubricate the sliding surfaces and also reduce the volume of air which is trapped in the chamber. The upper end of the casing 3ʰ is provided with a port 56 which is closed by an inwardly opening flap valve 57. The complementary rebound check mechanism of this organization comprises a twin-cup-piston-spring assemblage, 31ʰ—33ʰ—34ʰ—8ʰ, which is similar in all respects to that illustrated in Figs. 8, 9, and 10; and which is pivotally connected, at one end, to the body bracket 24$^h$ (by the adjustable bolt and nut elements 21$^h$—22$^h$) and, at the other end, to the axle bracket 10$^h$ by the U-shaped link 32$^h$ and an adjustable tension link 6$^h$ that conjoins an intermediate part of the link 32$^h$ with a third body bracket 58. When this system is subjected to a kinetic increase in load the resultant approach of the body and axle members (A—B) is cushioned by the concurrent flexure of the series connected springs M$^s$ and 1$^h$, and also by the temporary compression of the air which is trapped in the upper part of the supplemental spring chamber; and the cup 33$^h$ is also pushed downward in the cylinder 31$^h$ and away from the piston head 34$^h$ (as shown at the right of Fig. 8 and also in Fig. 9) thus permitting the liquid, L, which is above this head to pass down into the opened space between it and the said cup and to act as a fluid damping resistance to the return or recoil of the parts toward normal load position. The separation of the body and axle members beyond the position of static equilibrium is resisted by the straightening out of the toggle link connections 6$^h$—32$^h$, and the accompanying progressive compression of the coil spring 8$^h$ between the sliding cup members 31$^h$—33$^h$ (as shown in Fig. 21); but this restraint is exercised only on the rigid central part of the main spring M$^s$; the outer flexible portion of this primary suspension element—and the supplemental coil spring 1$^h$ connected therewith—being left free to deflex or expand to any desired extent. The relative outward movement of the plunger 55 in the casing 3$^h$—which accompanies the expansion of the load carrying springs—draws air through the port 56 and the inwardly opening valve 57; but when the rebound movement is checked and the parts begin to move back to normal load position, the valve 57 is closed and the air thus trapped in the supplemental spring chamber co-operates with the spring 1$^h$ in smoothly and easily taking up the reapplied load stress and transmitting it to the reflexed end of the main spring.

The excess of air which is "pumped" into the supplemental spring chamber during the above described operation escapes through the sliding joint between the plunger 55 and the casing 3$^h$, and performs the additional function of blowing out any water or dirt that may tend to accumulate in this bearing when the machine is being driven over wet or dusty roads. The lateral rigidity of the extended vertical bearing engagement between the relatively reciprocable supplemental spring supports—and between the bracket extension 40$^h$ and the guide slot 49$^h$—eliminates any side sway or unstable rocking of the freely oscillating end of the main spring M$^s$. Any endwise pitching, or longitudinal movement of the body frame relative to the front axle support, is also prevented by holding the forward extremity of the main spring extension 40$^h$ in fixed axial relation to the vertically rigid plunger 55. In the illustrative construction shown in Fig. 20—which is so designed as to permit it to be used in conjunction with either a front axle spring or a rear axle spring suspension—the bracket 40$^h$ is connected to the plunger through the intervention of a long shackle link; and in this case the necessary axial fixation of the pivotally connected parts is secured by the use of two clamp screws 59 that are adjusted to tightly engage the opposite edges to the aforesaid shackle link and hold it in integral relation to the plunger 55. When this same supplemental spring mounting is used to carry the end of a rear axle spring these screws are run back (as indicated in Fig. 22) so as to permit of relative endwise flexural movement between the main spring and the supplemental spring plunger.

The secondary elastic support construction shown in Fig. 20 constitutes a simple embryonic form of a semi-pneumatic supplemental spring, the typical characteristics and advantages of which are set forth more fully in one of my earlier applications Ser. No. 591,708, filed October 2d, 1922. Figs. 22 and 23 illustrate other more complete exemplifications of this type of structure which may be advantageously used on very large and heavy cars or trucks, in place of the supplemental spring suspension elements depicted in Figs. 11, 12 and 20 (or in place of the lever actuated supplemental spring combinations shown in Figs. 14 and 16). In these exemplifications the sliding bearings between the plunger members (55$^i$ or 55$^j$) and the casing supports therefor (3$^i$ or 3$^j$) are sealed against the escape of air from the supplemental spring chambers in the manner described below; and the load carrying capacity and elastic co-efficients of the secondary spring suspension elements may therefore be readily varied, through a wide range, by changing the volume and the pressure of the fluid which is confined therein.

In the organization illustrated in Fig. 22 the body supported casing comprises a bracket portion 3$^i$ (which is secured to the body horn B in the manner indicated in Fig. 20); a drawn sheet metal cap 3$^{ii}$ (which is screwed into the upper end of the bracket member); and a removable bearing bushing 60 that is threaded into the lower end of this bracket. The member 3$^{ii}$ is provided with an upset (or inset) rib, 61, which supports the upper end of an inner sleeve 62; and the thickened lower end of this sleeve is internally threaded to receive an annular flanged head 63 which carries a series of vertically superimposed rigid rings and intermediate flexible washers, 64, 65, 66, 67, 68 and 69 that are concurrently clamped in position between the enlarged end of the sleeve 62 and the lower flange of the head 63. The plunger member of this combination comprises a tubular portion 55$^i$—(which is provided at its upper end with an internal washer 70 that is in close sliding engagement with the external periphery of the sleeve 62, and which is also closely engaged, on the intermediate portion of its length by the expanded edges of the flexible packing rings 65 and 67)—and an inverted cup shaped head 55$^{ii}$ which closes the lower end of this tubular portion, and which is connected to the end of the main spring (not here shown) by the arm 40$^i$ and the link 71. The supplemental coil spring 1$^i$ is interposed between the base of the inverted cup member 55$^{ii}$ and the flanged plate or washer 72 at the upper end of the cap 3$^{ii}$; and the latter is perforated to receive a valve member 73 through which oil and air can be introduced into the supplemental spring chamber. The bore of the bushing 60 is slightly larger than the external diameter of the plunger 55$^i$; and the annular space between the parts is filled by an elongated sleeve 74 which is engaged, at its lower end, by the projecting edge of the head 55$^{ii}$, and is provided, at its upper end with an outwardly flanged portion that fits closely in the opening between the plunger 55$^i$ and the concentric bore of the casing 3$^i$. The flanged sleeve 74 is held down against the bushing 60 by superimposed coil compression springs 75 and 76 that are interposed between the said sleeve and the lower end of the casing cap 3$^{ii}$; and the contiguous ends of these springs are preferably separated by a sliding collar or piston element 77. The upper beveled edge of the flanged sleeve 74, and of the collar 77, are each provided with an upturned cup washer, 78, of leather or other suitable material, which is held in place by the pressure of the superimposed spring (75 or 76) on a reversely beveled ring 79; and both of these sliding members have a series of longitudinal ports 80 that terminate just below the free edges of the washers 78. The lower end of the outer annular chamber which contains the parts 55$^i$, 75, 76, 77, etc., is in communication with the external air through a passage way 81 that is closed by an inwardly opening ball valve 82; and the upper end of this chamber is provided with a discharge port 83 that is covered by an outwardly opening relief valve 84. The valve element 84 is mounted in a box 85 which is welded, or otherwise suitably secured, on the inner wall of the casing sleeve 62 and which communicates with the exterior of the casing through the vent opening 86; and the stem of this valve is attached to a flexible diaphragm 87 that closes the inner end of the box 85. The upper end of the plunger 55$^i$ is further provided with a small orifice 88 that affords a restricted communication between the annular plunger chamber and the narrow clearance space which separates the parts 55$^i$ and 62 and which communicates in turn (through the downwardly yielding packing washer 65) with the oil collection groove 89 in the head 63.

In the use of this supplemental spring structure the inner chamber is partially filled with oil (e. g., to the level L), and the remaining space, above the oil, is then charged with compressed gas, P, until the combined pneumatic and mechanical spring tensions are sufficient to balance the normal load stress on the associated body member, B, when the parts are in the position shown in Fig. 22. When the elastic suspension system is subjected to a compressive shock, the plunger member (55$^i$—55$^{ii}$) is moved upward in the casing support (3$^i$—3$^{ii}$ etc)—or vice versa—and the initially tensioned spring elements 1$^i$ and P) are further compressed in proportion to the magnitude of the imposed kinetic load. This movement also lifts the flanged sleeve 74 away from the end of the bushing 60, and correspondingly compresses both of the springs 75—76,—as well as the air that is trapped above the packing washers 78—and these auxiliary actions co-operate with the reactive pressures of the spring elements 1$^i$ and P, in cushioning and elastically absorbing the compressive shock. The upward movement of the member 74, relative to the casing members 3$^i$—60, opens the valve 82, and permits the expanding space, above the bushing 60, to be filled with air at atmospheric pressure. When the return movement begins the valve 82 is closed and the air that is trapped in the annular space between the parts 3$^i$—60—74 is compressed by the expansion of the coil springs 75 and 76—without imposing any resistance to the recoil movement of the springs 1$^i$ and P or of the plunger member 55$^i$—and this compressed air is in part expelled through the sliding joint between the parts 60—74, and in part forced through the ports 80, and past the lips of the cup washers 78, into the annular space P' above the auxiliary piston elements 74 and 77. When the expansion of the springs 75 and 76 has returned the sleeve 74 to its normal static load position (Fig. 22) all further outward movement of this member is prevented—by the engagement of its flanged head with the bushing 60—but the plunger 55$^i$ can continue to move downwardly with respect to its casing support, when the parts rebound or expand beyond normal load position; and this unrestricted rebound movement will concurrently increase the volume, and simultaneously decrease the pressure, of the fluid in both the outer and the inner spring chambers.

The added quantity of air which is pumped into the outer auxiliary spring chamber P'—on each expansion stroke of the parts 74 and 77—will progressively raise the pressure therein; and the continued reciprocatory movement of the sleeve 74—under the effect of a series of compressive shocks—will very soon raise this pressure to that of the inner chamber (P). When this occurs the forces acting on the opposite sides of the connected valve elements, 84—87, are substantially balanced; and this balance will then be automatically maintained, as the operation continues, by the intermittent venting and relief of any excess pressure on the outer face of the valve 84, through the box 85 and the discharge port, 86. The pressures on the two sides of the sliding joint between the parts $55^1$ and 65 to 69 inclusive, are thus kept substantially equal, when the pneumatic spring is performing its intended functions; and any leakage of oil from the inner chamber—past the main packing washer 67 to the ring recess 89—is thus largely or completely avoided even when the parts have a very easy sliding fit. Any tendency to leakage when the parts are at rest is minimized by the use of the flexible sheet metal ring 69 which is expanded by the internal pressure of the air spring (acting through the ports 90) and which serves to keep the main packing washer 67 in close contact engagement with the inner surface of the plunger $55^1$. Any substantial leakage that may occur, during a long continued period of inactivity, will be forced back into the inner chamber when the parts are once more put in operation, by the semi-return check action of the restricted connections between the chambers P' and 89. For when the pressure in these chambers has been equalized with that in the inner chamber (P) by a series of compression strokes, any pronounced rebound movement will increase the internal volume, and diminish the internal pressure, of the air spring more rapidly than the partially trapped air in the oil collection groove 89 can expand and escape therefrom; and the resultant momentary unbalancing of the pressures on the two sides of the bearing member 67 will permit successive small quantities of oil to be forced back past this downwardly yielding washer—(or through an auxiliary check valve 91)—into the inner chamber, at each substantial separation of the parts beyond normal load position.

Fig. 23 illustrates another semi-pneumatic supplemental spring structure which closely resembles the one shown in Fig. 22. This alternative construction comprises the body casing $3^1$, which is provided, at its upper end, with a detachable cap $3^{11}$; an inner casing $62^1$ which is closed at the top by a flanged head $72^1$ that is clamped in place between the parts $3^1$—$3^{11}$ and is provided, at the bottom, with an enlarged sleeve $63^1$; and a two part plunger consisting of the tubular member $55^1$ and the lower head $55^{11}$. The upper end of the plunger tube $55^1$ is lined with a packing ring $70^1$ that bears on the outer surface of the casing $62^1$; and the median portion of this tube is reciprocally engaged by the flexible cup washers $65^1$, $67^1$ that are held in expanded position on the casing sleeve $63^1$ by the spacer and expander rings $66^1$ and $69^1$ and the sleeve nut 92. The lower end of the casing $3^1$ is threaded to receive a removable bushing $60^1$ that engages with the outer surface of the plunger head $55^{11}$; and the annular space above the end of this bushing—between the bore of the casing $3^1$ and the tube $55^1$—contains a pair of annular pistons $74^1$ and $77^1$, which are each provided with upturned piston rings and washers $78^1$—$79^1$, and which are normally held in the position shown in Fig. 23 by the super-imposed compression springs $75^1$ and $76^1$. The opening below the lower piston $14^1$ communicates with the external air through a passageway $81^1$ that is controlled by an inwardly opening ball valve $82^1$; and the space above the upper piston can be vented through ports $83^1$—$86^1$ which lead to the openings between the caps $3^{11}$ and $72^1$ and thence to the outside of the casing, and which are normally closed by a valve head $84^1$ that is attached to the head of the balancing sylphon $87^1$. The annular chamber P', in which the plunger $55^1$ reciprocates, is also in communication with the clearance space between this plunger and the casing $62^1$—and with the annular groove $89^1$ between this casing and the terminal sleeve $63^1$—through the restricted orifices $88^1$ and 93. A powerful coil compression spring $1^1$ is interposed between the heads $72^1$ and $55^{11}$; and the latter member is pivotally coupled to the end of the main spring by means of the bracket $40^1$ and the link $71^1$. The pintle pin connection between the parts $40^1$—$71^1$ passes through arcuate slots 94, that are formed in the side flanges 95 of the lower head; and the link $71^1$ can be clamped in any desired position by tightening up the nuts $59^1$ on the ends of this pin (if the device is to be used as the forward terminal support of the front axle spring), or it may be left to swing freely with respect to the head $55^{11}$ if the device is to be used as the supplemental spring suspension element of a rear side leaf spring system.

This last described semi-pneumatic spring is also partially filled with oil, and is then charged with compressed air (through the valve $73^1$) until the combined initial tensions of the co-operating spring elements $1^1$, P, $75^1$ and $76^1$ will balance the normal load stress on the associated body member B when the parts are in the position shown in Fig. 23. The operation of the various mutually reciprocating parts—in cushioning and absorbing compressive shocks; in automatically equalizing the fluid pressures on the two sides of the sliding joint between the plunger and the casing members; and in returning any substantial static leakage of oil to the inner air spring chamber—is essentially the same as that which characterizes the construction shown in Fig. 22, and does not, therefore, require further explanation. It will be observed, in this connection, that the rebound movement of both of these semi-pneumatic spring structures is perfectly free, and unrestricted by any frictional damping, or counteracting spring resistance; and that the possible range of this movement is at least twice that of the compression movement—which is definitely limited by the engagement of the plunger heads ($55^{11}$ or $55^{11}$) with the inner casing heads ($63$ or $63^1$)—and that, because of these features, the outer flexible portions of the conjoined main springs ($M^s$) with which these supplemental springs are connected, are not subjected to any reflexing, or negative bending strains, when the suspension system is expanded beyond normal load position;—all of the restraint on such abnormal expansion or upthrow being obtained, as already explained, by the use of complementary rebound check elements which act on relatively rigid portions of the oscillating chassis members. The forms of air spring construction hereinbefore described (Figs. 22 and 23) are therefore, as previously stated, particularly suited for use as the supplemental suspension elements of my improved complementary triple-spring combinations; but the very feature which makes them of special value in such a combination (viz, the unrestricted rebound movement of the supplemental spring itself) would be a pronounced disadvantage in either the conventional single acting supplemental spring support systems, or in such improved double acting main-supplemental spring combinations as form the subjects-matter of some of my earlier applications (e. g., Ser. Nos. 573,882, filed July 10th, 1922; 591,708, filed Oct. 2d, 1922; or 607,308, filed Dec. 16th, 1922) in which other forms of semi-pneumatic air springs are described and claimed.

It will be observed that all of the preceding exemplifications of my present improvements present certain distinctive features. One of these features is the elimination of all stops or other parts which would prevent the free or unrestrained and unlimited or complete expansion of the supplemental spring suspension elements that support the end, or ends, of the main spring members; and thus free the latter from any restraint that would tend to impose a reverse or negative bending and breaking strain thereon when the body and axle parts rebound beyond their normal load positions. Another feature of great importance is the provision of a frictional drag or damping action on the recoil of the main spring from a compressed position toward normal load position—thus restraining the violence or abruptness of this return movement—and the further provision of an added resistance to any continued rebound movement beyond normal load position. These successively acting cooperative restraints, which I have provided for the control of the expansion movements, are "one way" devices; i. e. they are of such a character that they do not impose any sensible load on the normally positioned parts, or tend to increase the normal load compression of the main and supplemental spring suspension elements, but act only to resist the recoil and rebound motions of the main spring alone. Still another feature of substantial consequence is the mounting of the complemental recoil and rebound check mechanisms in such manner that they automatically resist any lateral displacement of the spring connected body and axle parts during the separation or expansion movements of these members; and thereby prevent the dangerous rolling or pitching of the tonneau when the vehicle is being driven rapidly over a rough road or around corners at a high speed. It is the combination of these and other specific features, in a single organization, that constitutes the generic basis of the present improvements.

The various structural and functional characteristics which are distinctive of my present invention—and which differentiate the various embodiments thereof from previously described shock absorber constructions—will now be clearly understood by those skilled in this art; and with the preceding disclosure as a guide, engineers and others familiar with this class of apparatus will be enabled to utilize these improvements—in whole or in part as may be desirable—in conjunction with any desired type or species of suspension organizations (e. g., with cantilever and platform spring systems as well as with the conventional cross-leaf and side-leaf spring supports), and with any form of chassis frame construction that various builders may prefer to use. The herein described structures are therefore to be regarded as only illustrative of certain typical exemplifications of this invention; and are not to be considered as delimiting the character or the scope thereof except to the extent indicated in the accompanying claims.

What I claim is:

1. In a shock absorber construction for vehicles the combination of a main spring member, a supplemental spring member elastically conjoining a flexible part of the said main spring with a relatively rigid part of the said construction and permitting both a free undamped compression and a free complete expansion of the said conjoined spring parts, and a rebound check member conjoining a relatively rigid part of the main spring with an opposing part of the vehicle chassis frame, substantially as described.

2. In an elastic suspension system for two relatively oscillating rigid members the combination of a main spring rigidly attached to one of said members, a supplemental spring interposed between a flexible portion of said main spring and the other of said rigid members and arranged to permit both the free undamped compression and the free complete expansion of the conjoined spring parts when the system is successively subjected to increased and decreased load stresses, and a rebound check mechanism conjoining a substantially inflexible part of the main spring with the member opposed thereto, substantially as described.

3. In a spring suspension system for vehicle bodies the combination of a main leaf spring, a freely expansible supplemental spring elastically conjoining a flexible portion of the said main spring with a relatively rigid part of the said system and permitting both a free undamped compression and a free complete expansion of the said conjoined parts, and a complemental rebound check member conjoining the substantially inflexible part of the main spring with a relatively movable part of the vehicle and acting to restrain the rebound or abnormal separation of these conjoined parts, substantially as described.

4. In a spring suspension organization for two relatively oscillating vehicle members, the combination of a main spring having one period of oscillation, a supplemental spring having a different period of oscillation connected in series with a flexible portion of the said main spring, and a complemental rebound check member conjoining relatively inflexible portions of the said members and acting successively to impose a frictional restraint on recoil from any position of compression, and to resist the rebound or separation of the members beyond normal load position, substantially as described.

5. A spring suspension system for vehicles which comprises, a main spring and a supplemental spring coupled in series therewith to elastically resist compressive movements and to permit free and complete expansion movements of the coupled spring elements, and a complementary rebound check member connected in parallel with the series coupled springs to restrain expansion movements of the vehicle parts without imposing any control action on the compression of the load resisting springs, substantially as described.

6. An elastic suspension system for relatively oscillating members which comprises a main spring mechanism, a supplemental spring co-acting in series therewith to elastically resist the approach of the said members and to permit the free and complete expansion of the said coacting springs, and a complementary rebound check mechanism coupled in parallel with the said co-acting springs to resist the separation of the said members without imposing any check on the compression of the said springs, substantially as described.

7. An elastic suspension system for two relatively movable members which comprises in combination, a plurality of series connected springs interposed between the said members and acting to elastically cushion and absorb compression shock, and a composite friction spring rebound check member connected in parallel with the compression resisting springs and acting to progressively restrain recoil and rebound movements of the system without limiting the free compression of the said connected springs.

8. In an elastic suspension system for vehicles the combination of a plurality of springs interposed in series between the body and axle members, and acting to restrain and arrest the compression or approach movements of those members, a complementary rebound check spring rigidly secured to one of said members, and a "one way" connection between said complementary spring and the other of said members and acting to successively impose a frictional restraint on the separation of the said members and an increased flexure on the rebound check spring, substantially as described.

9. In an elastic suspension system for vehicles the combination of a main leaf spring secured to one of the relatively oscillating vehicle members, a supplemental spring interposed between a flexible portion of the main spring and another of these members, a complementary rebound check mechanism conjoining the inflexible part of said main spring with the member on which the supplemental spring is supported and acting to resist both the vertical separation and the lateral displacement of the vehicle body and axle gear.

10. In an elastic suspension system for vehicles the combination of a main spring, a supplemental spring co-acting in series therewith to elastically support the load stresses on the body and axle members, a complementary rebound check member coupled in parallel with the said series connected springs and acting to restrain the separation of the said members without imposing any limitation on the free compression or the complete expansion of the load supporting springs and further acting to resist lateral displacement of the body on its running gear supports.

11. An elastic suspension system for vehicles which comprises, a main spring rigidly attached to one of the vehicle members, a movable lever coupled to a relatively flexible portion of the said main spring, a supplemental spring interposed between the lever and another part of the said system and acting in series with the said main spring to cushion compressive movements thereof, and a complementary rebound check mechanism conjoining a relatively inflexible portion of the main spring with an opposing vehicle member and acting to restrain expansion movements of the said system without limiting either the compression or the reflex movements of the said springs.

12. A shock absorber system for two relatively movable members which comprises a main spring, a supplemental spring, a lever conjoining a flexible portion of said main spring with said supplemental spring and acting to impose concurrently increased flexures on both of said springs when the said members approach each other, and a complemental rebound check mechanism conjoining said members and acting to resist any separation thereof without limiting the concurrent compression or expansion movements of the said conjoining and conjoined lever-spring elements.

13. In a shock absorber system for two relatively movable members the combination, of a plurality of springs interposed between the said members, a lever conjoining said springs and acting to impose concurrently increased flexures thereon when the members move toward each other, and a complementary rebound check mechanism interposed between said members and acting to impose both an elastic and frictional resistance on the separation thereof without limiting either the compression or the free expansion movements of the said springs.

14. In an elastic suspension system for two relatively movable members the combination of a main spring rigidly fixed on one of the said members, a lever pivotally mounted on the other, a flexible connection between said lever and an elastic portion of said main spring, a secondary spring interposed between the lever and another part of the system and acting to supplement the main spring in resisting the approach movements of the suspended members, and a complemental rebound check mechanism conjoining the said members and acting to resist any and all relative separation thereof when the compressive load on the system is reduced.

15. In a shock absorber for vehicles the combination of a plurality of compression resisting springs interposed between the body and axle members thereof, means conjoining said members with the said springs and acting to impose individually different flexures thereon when the members approach each other, a composite spring-friction mechanism, a longitudinally rigid coupling between this mechanism and one of said members, and a one way clutch connection between said mechanism the other of said members acting to impose a restraint on any expansion movements thereof.

16. In a shock absorber mechanism for two relatively movable bodies the combination of a plurality of springs of varying elastic periods, means conjoining said bodies and said springs and acting to impose different degrees of undamped flexure on each of them when the bodies are subjected to compressive stresses, and a complementary expansion check member conjoining said bodies and acting to impose a joint frictional and elastic restraint on the separation thereof when the compressive stress is reduced.

17. A flexible suspension system for vehicle bodies which comprises a main spring, a lever flexibly coupled to one extremity of the said spring, a supplemental spring conjoining said lever with a relatively rigid part of the said system, and a structurally separate expansion check mechanism conjoining the vehicle body with the running gear support therefor to resist any separation of the said body and running gear parts without imposing any restraint on either the compression or the expansion of the said springs.

In testimony whereof I have hereunto set my hand.

FRANK L. O. WADSWORTH.